United States Patent Office 3,430,906
Patented Mar. 4, 1969

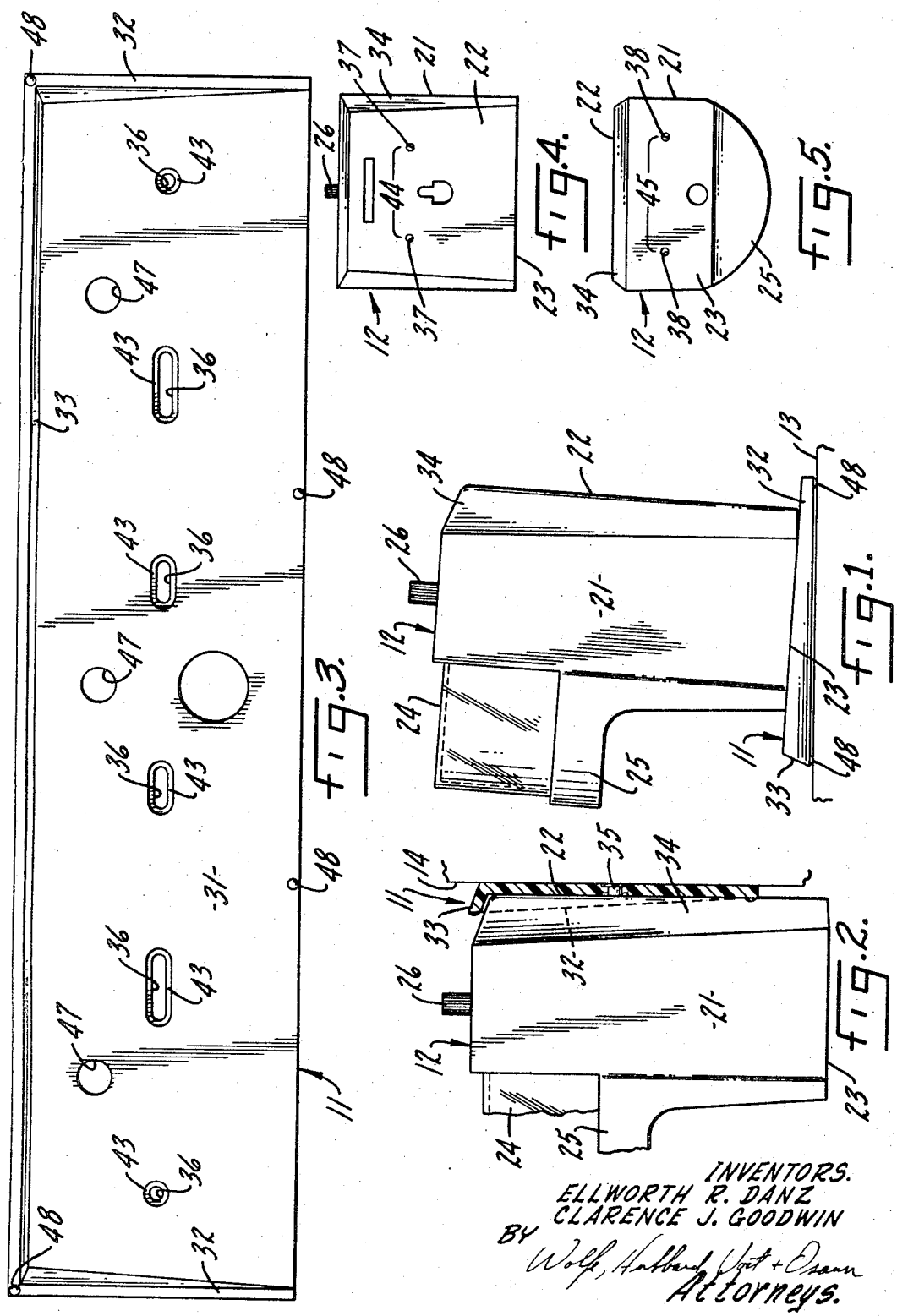

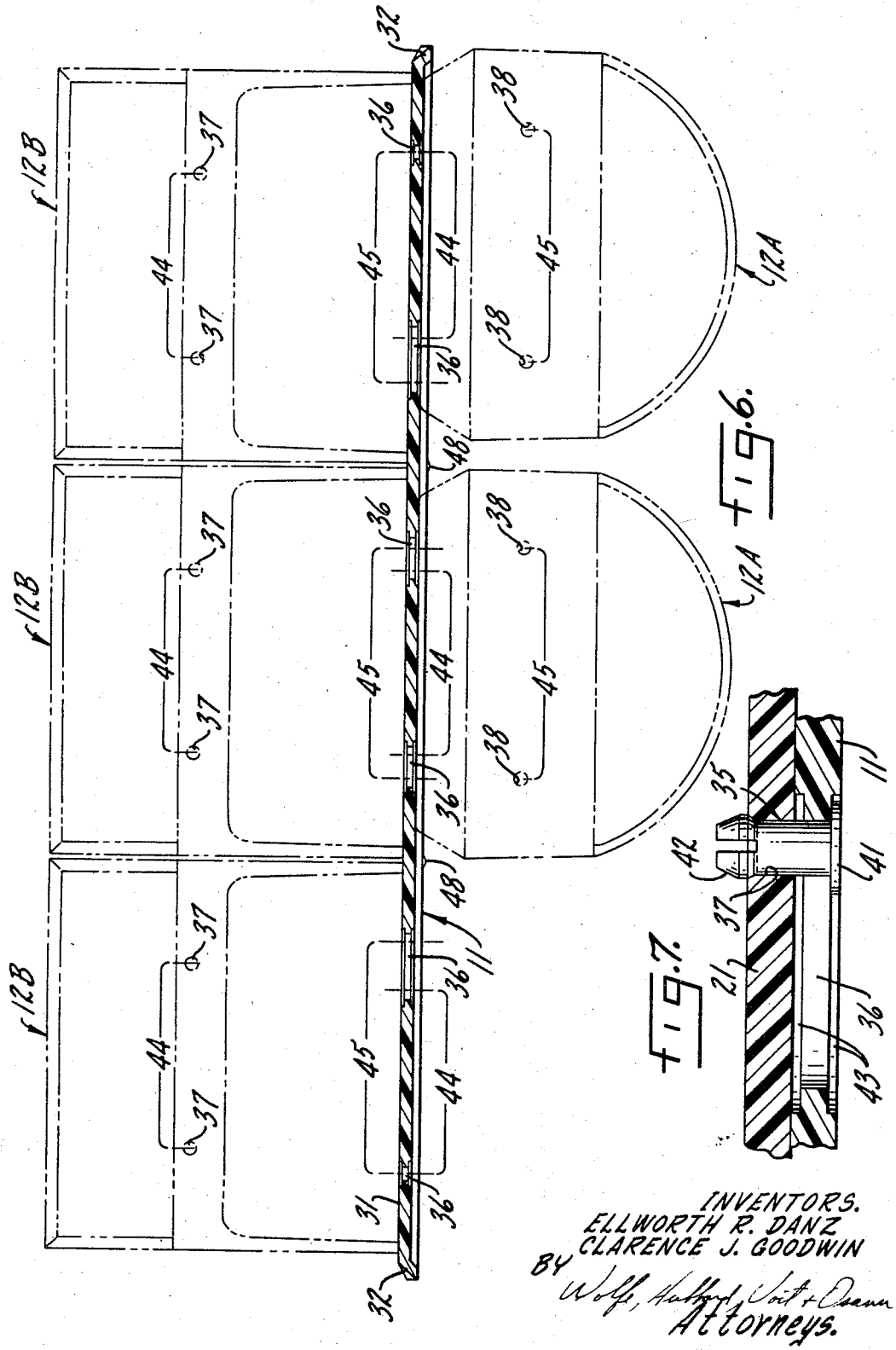

3,430,906
TWO-WAY INSTRUMENT MOUNT
Ellworth R. Danz and Clarence J. Goodwin, La Salle, Ill., assignors to General Time Corporation, Stamford, Conn., a corporation of Delaware
Filed Apr. 18, 1967, Ser. No. 631,759
U.S. Cl. 248—126                4 Claims
Int. Cl. A47g 29/00; A47f 5/00; A47h 1/10

ABSTRACT OF THE DISCLOSURE

An instrument mounting arrangement suitable for supporting a plurality of instruments of the thermometer, barometer, etc. type on either a vertical wall or a horizontal surface, with the assembly having a snap action interchangeability.

---

This invention relates generally to housings for instruments of the thermometer, barometer, etc. type often used in homes and offices, and concerns more particularly a support arrangement for mounting a group of such instruments on either a wall or a table-top like surface.

The primary aim of the invention is to provide an economical arrangement for mounting a group of instruments attractively for support on a wall surface or, alternatively, on a desk or table top.

Another object of the invention is to provide such an arrangement in which the instruments can be easily snap-locked into either wall or table mounting positions, as the user sees fit.

A collateral object is to provide a mounting arrangement of the above type in which the instruments are properly spaced on a single double-purpose base for either wall or table top mounting.

Other objects and advantages of the invention will become apparent upon reading the following detailed description and upon reference to the drawings, in which:

FIGURE 1 is an end elevation of an instrument assembly embodying the invention arranged for horizontal surface support;

FIG. 2 is a fragmentary elevation, partially in section, of the FIG. 1 assembly arranged for mounting on a vertical surface;

FIG. 3 is a plan view of a portion of the assembly shown in FIGS. 1 and 2;

FIG. 4 is a rear view of one of the instruments shown in FIGS. 1 and 2;

FIG. 5 is a bottom view of the instruments shown in FIG. 4;

FIG. 6 is a section of the plate shown in FIG. 3 with alternate positions of the instruments shown in phantom lines; and FIG. 7 is an enlarged fragmentary section showing the locking arrangement for the assembly of FIGS. 1 and 2.

While the invention will be described in connection with a preferred embodiment, it will be understood that we do not intend to limit the invention to that embodiment. On the contrary, we intend to cover all alternatives, modifications and equivalents as may be included within the spirit and scope of the invention.

Turning now to the drawings, there is shown an elongated base plate 11 intended to mount a plurality of instruments 12 on either a horizontal surface 13 (FIG. 1) or a vertical surface 14 (FIG. 2). In the illustrated arrangement, the base plate 11 supports a group of three instruments 12 in a side-by-side row. The instruments 12 can be of any type, but it is particularly contemplated that they be related in function, as a set of environment instruments including a thermometer, barometer and hygrometer.

Preferably, each instrument 12 is identical in styling, including a body or housing 21 having a back surface 22, a bottom surface 23, and a front window 24 displaying appropriate scales and indicators. In the instruments illustrated, the front window 24 is arcuate and supported on a ledge portion 25 of the housing 21, and a setting knob 26 for a "prior reading" pointer extends from the top of the instrument.

In carrying out the invention, the base plate 11 includes a sheet-like panel 31 with edge flanges 32 extending in one direction from the plane of the panel. The flanges 32 are tapered from the plane of the panel to a maximum width at what is the front or top of the plate 11, and the plate includes another flange 33 connecting the edge flanges 32. The flanges 32, 33 thus define, when extending from the vertical surface 14 against which the plate may be secured, a frame or rim about the instruments (see FIG. 2 and the instrument positions 12A in FIG. 6). When the flanges 32, 33 are turned down onto the horizontal surface 13, the flanges hold the plate in a rearwardly tilted position (see FIG. 1 and the 12B instrument positions in FIG. 6).

In keeping with the invention, the instrument housing back portions 34 are shaped to recess within the flanges 32, 33, and resilient pins 35 are provided to lock the instrument back surfaces 22 against one side of the base plate 11 or, alternatively, the instrument bottom surfaces 23 against the opposite side of the base plate. Thus, for vertical surface mounting on a wall or the like, the instruments are held upright surrounded by the neatly-fitting rim defined by the flanges 32, 33 (FIG. 2). For horizontal surface placement, as on a desk or table top, the instruments are held rearwardly tilted for easy visibility.

To lock the instruments 12 in place, the resilient pins 35 pass through locating openings 36 disposed in a row along the length of the base plate 11, one pin being fitted through each opening, and the pins are received either in pairs of holes 37 formed in the instrument back surfaces 22 or in pairs of holes 38 in the instrument bottom surfaces 23. The pins 35, of which six are required to lock the three instruments to the plate 11, have flat heads 41 and slotted, enlarged tips 42 (see FIG. 7). The pins are formed of resilient material and the openings 36 and holes 37, 38 are formed so that the expandable pin tips 42 snap into locking engagement within the holes 37, 38 after having been passed through the openings 36. Preferably, the edges of the base plate openings 36 are countersunk at 43 to receive the heads 41 of the pins 34.

A feature of the invention lies in forming the middle four openings 36 in the base plate 11 as elongated slots, the end two openings as circular holes, and providing one spacing of the instruments 12 when they are locked one spacing 44 for the instrument back openings 37 and another spacing 45 for the instrument bottom holes 38. This results in automatically varying the spacing of the instruments 12 when they are locked on the plate 11 depending on whether they are secured for vertical surface mounting or for horizontal surface placement. Thus, when wall mounted, the instruments neatly fit the flange-defined rim running about three-sides of the plate 11. When desk or table-top supported, the instruments 12 are attractively spaced in from the edges of the panel portion 31 of the base plate 11.

As will be readily seen, this desirable spacing is accomplished by causing the spacing 44 to position the back holes 37 further from the sides of the instrument 12 than are the bottom holes 38 with their spacing 45 (compare FIGS. 4 and 5). When the back holes 37 are used, the two endmost instruments in the row of three are thus held closer to the ends of the base plate 11 than when the bottom holes 38 are employed. As shown in FIG. 6, the slotted openings 36 are sufficiently long to accommodate both the back hole spacing 44 and the bottom hole spacing 45. The three instrument housings 21 are identical and the holes 37, 38 are symmetrically located so that the arrangement of instruments can be varied in any desired order.

Preferably, the base plate 11 is also formed with mounting holes 47 to facilitate securing the base plate to the vertical surface 14, and a plurality of feet 48 are also preferably formed on the plate 11 to insure scratch-free support on the horizontal surface 13. It has also been found desirable to mold all of the parts, including the base plate 11, the instrument housings 21 and the pins 35, out of plastic.

It will thus be seen that the instrument assembly described above economically provides an alternate mounting arrangement for a group of instruments so that the instruments can be attractively supported on either a wall surface or, alternatively, on a flat table or desk top. The resilience of the pins 35 locking the instruments to their base plate permits the mounting to be varied at will. Because of the spacing of the instrument housing holes 37, 38, the proper spacing of the instruments on the plate in either mounting arrangement is insured.

We claim as our invention:

1. An instrument assembly comprising, in combination, a base plate having a sheet-like panel with edge flanges extending in one direction from the plane of the panel, said flanges being tapered so that said panel is inclined when the flanges rest on a horizontal surface, an instrument housing having bottom and back surfaces, and means for locking either said bottom surface on said panel on the side opposite said flanges or said back surface on said panel on the side within said flanges, said housing having its back portion shaped to recess within said flanges.

2. The combination of claim 1 in which said means for locking both locates said housing back portion snugly within said flanges for neat wall mounting when said back surface is locked on said panel and also locates said bottom surface away from the panel edges for attractive table support when said bottom surface is locked on said panel.

3. The combination of claim 1 in which said means includes locating holes in the back and bottom surfaces of said housing, locating openings in said panel which register with said holes, and resiliently expandable pins inserted through said openings into snapping engagement within said holes.

4. The combination of claim 3 including two more of said housings and in which said base plate is elongated to receive said three housings in a side-by-side row, said plate panel openings being in a line and including two end holes and four intermediate slots elongated in the line of said openings, and said housing surface holes including a pair of holes in each back surface and a pair of holes in each bottom surface with the spacing at each pair being such to properly space the end housings in said row when said pins are inserted through said slots and holes.

References Cited
UNITED STATES PATENTS

| | | | |
|---|---|---|---|
| 1,708,579 | 4/1929 | Johnson | 248—126 |
| 2,981,510 | 4/1961 | Burns | 248—126 |
| 3,078,016 | 2/1963 | Judy | 222—181 |

ROY D. FRAZIER, *Primary Examiner.*

FRANK DOMOTOR, *Assistant Examiner.*

U.S. Cl. X.R.

248—310